J. LANE.

Plow.

No. 6,320. Reissued March 9, 1875.

WITNESSES:

P. C. Dieterich

W. C. McArthur

INVENTOR.

John Lane per.

C. H. Watson & Co

ATTORNEYS

THE GRAPHIC CO. PHOTO-LITH. 39 & 41 PARK PLACE, N.Y.

UNITED STATES PATENT OFFICE

JOHN LANE, OF CHICAGO, ILLINOIS, ASSIGNOR, BY MESNE ASSIGNMENTS, TO HAPGOOD & CO., OF ST. LOUIS, MISSOURI.

IMPROVEMENT IN PLOWS.

Specification forming part of Letters Patent No. 111,854, dated February 14, 1871; reissue No. 6,320, dated March 9, 1875; application filed February 20, 1875.

*To all whom it may concern:*

Be it known that I, JOHN LANE, of Chicago, in the county of Cook and State of Illinois, have invented certain new and useful Improvements in Plow-Blocks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to plows having a block on which parts of the plow are bolted; and it consists in the peculiar construction and formation of the plow-block, which is interposed, and to which is bolted the mold-board, share, land-side bar, and standard of a plow, made substantially in the manner hereinafter set forth.

My improved plow-block is made of thin metal plate, bent to shape in cross-section, V form, one leg or side of which is bolted to and fits under the mold-board and share, while the other leg or side is bolted to the land-side bar and standard.

Figure 1:
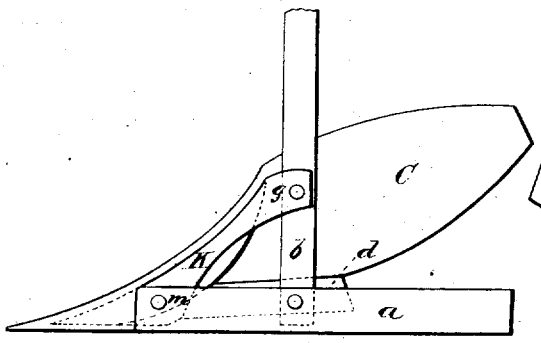
Figure 2:
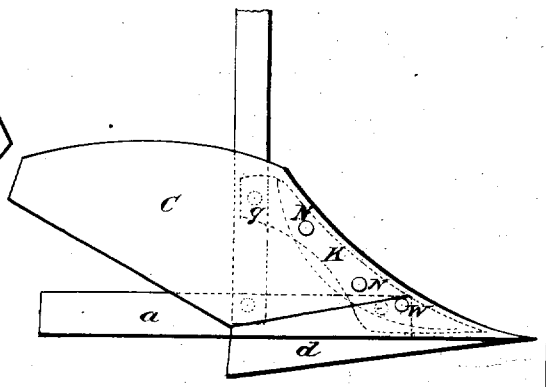
Figure 3:
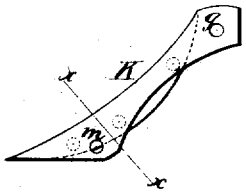
Figure 5:
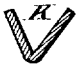
Figure 4:
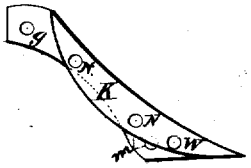

Referring to the drawing, Figures 1 and 2 give views of plows, showing the position of the plow-block interposed under the mold-board and share. Figs. 3, 4, and 5 are detached views of the plow-block.

*a* represents the land-side bar. *b* is the standard. *c* is the mold-board, and *d* is the share. K is my improved plow-block. The share is bolted to the block at W. The mold-board is bolted to the block at N, the standard at *g*, and the land-side bar at *m*.

Additional bolts may or may not be used, as desired, and the bolts may be in any position which shall hold the several parts together, as shown.

To make my improved plow-block, thin wrought-metal plate is cut in a form as a blank, which blank is heated to a working heat and placed in a press between properly-constructed dies, which give the shape required, so that one side shall fit the under side of the mold-board and share, while the other side or part shall fit the inside of the land-side bar and the side of the standard.

By the use of my improved plow-block I am enabled to make a light and strong plow, and at a less cost. The parts are held together more firmly than they would be were the block in two or more pieces, and are not as liable to break as if of cast-iron.

I am aware that it is not new to interpose a cast-iron block having a flange under the mold-board. Such I do not claim, and I do not broadly claim metal couplings.

My improved wrought-metal plow-block, bent of V form in its cross-section, extends from under the share and mold-board, by the side of the land-side bar, and its top end by the side of the standard, near the junction of the mold-board and standard, as shown in the drawing.

Having thus fully described my invention, what I claim as new, and desire to secure by Letters Patent, is—

1. The plow-block K, V-shaped in cross-section, and formed as described, to have affixed thereto the land-side, share, mold-board, and standard.

2. The removable plow-block K, perforated at *g*, N, W, and *m*, whereby to it is bolted the standard at *g*, the land-side bar at *m*, the share at W, and the mold-board at N, arranged substantially as and for the purposes shown.

In testimony that I claim the foregoing I have hereunto set my hand this 16th day of February, 1875.

JOHN LANE.

Witnesses:
JOHN G. PATTEN,
ERNEST J. LANE.